A. WEISS.
STARTING DEVICE FOR EXPLOSIVE ENGINES.
APPLICATION FILED APR. 12, 1919.
1,361,787. Patented Dec. 7, 1920.
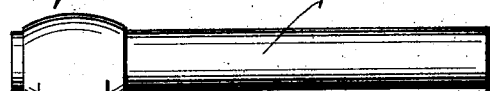
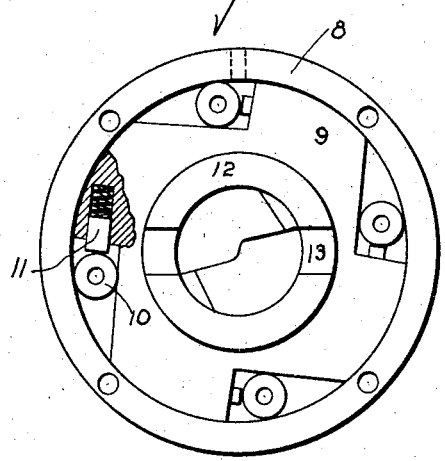
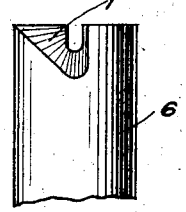
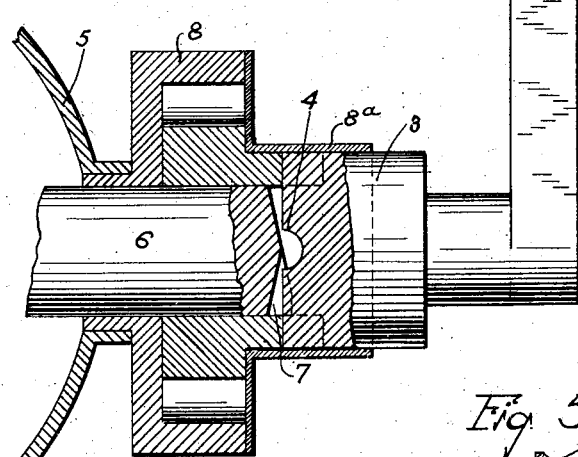
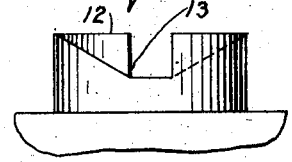
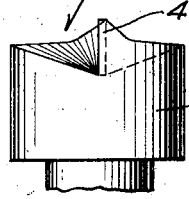
WITNESSES
Robert Burns
INVENTOR
ABRAHAM WEISS
BY
ATTORNEYS

UNITED STATES PATENT OFFICE.

ABRAHAM WEISS, OF NEW YORK, N. Y.

STARTING DEVICE FOR EXPLOSIVE-ENGINES.

1,361,787.  Specification of Letters Patent.  Patented Dec. 7, 1920.

Application filed April 12, 1919. Serial No. 289,504.

*To all whom it may concern:*

Be it known that I, ABRAHAM WEISS, a citizen of the United States, and a resident of the city of New York, borough of Manhattan, in the county and State of New York, have invented a new and Improved Starting Device for Explosive-Engines, of which the following is a full, clear, and exact description.

It is well known that a great number of accidents have occurred in cranking internal-combustion engines, particularly high-speed engines, such as are used in cars of the "Ford" type, in view of the fact that through negligence, or other cause, the spark is advanced too far, resulting in a back-fire when the engine is turned over preliminary to starting the same.

This invention aims to provide a crank by means of which the crank shaft of an engine may be turned over at will, but should the engine back-fire, resulting in a reversal in the direction of rotation of the crank shaft, the crank will be thrown automatically out of engagement with the crank shaft and, consequently, no injury could result to the person operating the same.

A further object of this invention is to provide a device of this nature which may be applied to any machine subsequent to its being manufactured, the device being in the nature of an attachment and being extremely simple in construction and efficient in operation.

Reference is had to the attached sheet of drawings which illustrate one practical embodiment of my improved crank, and in which—

Figure 1 is a side elevational view, partly in section, of a crank, a crank shaft of an engine, and means whereby the crank handle is thrown out of engagement with such crank shaft;

Fig. 2 is a front elevational view, partly in section, of the apparatus, whereby the crank handle is thrown out of engagement with the crank shaft, the latter being also shown in this view;

Fig. 3 is a side elevational view of the end of the crank shaft and the engine;

Fig. 4 is an end view of the inclined pathway utilized to throw the crank shaft out of engagement with the crank handle; and Fig. 5 is a side elevation of the end of the crank handle employed.

In these various views, 1 designates the handle of the crank 2, the end of which is formed with the head 3 provided with inclined shoulder portions 4, which shoulders extend almost across the entire face of such head, as clearly shown in Fig. 1. Extending outwardly, in the usual manner, from the crank-shaft housing 5 is a crank shaft 6 provided with the usual notched end 7, which is adapted to be engaged by the shoulders 4 of the crank head 3.

Surrounding the crank shaft 6 is an annular casing housing 8, in which is mounted a frictional clutch 9, of conventional construction, comprising a rotor formed with notches and rollers 10 pressed outwardly by springs 11. Secured to the rotor, and preferably integral therewith, is an outstanding collar 12 projecting beyond the casing and formed with inclined shouldered notches 13 into which the shoulders 4 of the crank head 3 project. The face-plate of the clutch casing 8 may be provided with a central outwardly projecting sleeve 8ª into which the collar extends, and which will also receive and support the head 3 of the hand crank during the cranking operation.

In operation it will now be seen that the crank shaft 6 may be turned, by virtue of the engagement of its shoulders 7 with the shoulders 4 of the crank head, in a given direction, but should the crank shaft tend to rotate in a retrograde direction, caused by a back-fire, the friction clutch 9 will immediately lock against such motion. The collar 12, of course, will become stationary and the crank shaft 6 will tend to rotate the head 3 of crank 2 in this retrograde direction. This will immediately result in the shoulders 4 of the crank head 3 being engaged by the inclined shouldered notches 13 of the collar 12, forcing the crank head along such notches 13, for the reason that, as aforesaid, the collar 12 is now stationary, and, consequently, resulting in the crank 2 being moved bodily outward and completely freed from engagement with the crank shaft 6.

It will be appreciated that the afore-mentioned operation will of course result in the crank handle being moved slightly in an anti-clockwise direction before the head disengages from the end of the engine crank shaft 6, but it is pointed out that this motion will be slight indeed and can in no wise be compared to the complete circle thrown by the crank handle 1 of the conventional crank when the engine back fires, which does not even disengage if the engine keeps on running backward, as is often the case.

Having thus described my invention, I claim as new and desire to secure by Letters Patent:

A starting device for explosive engines including the end of the engine crank shaft formed with inclined notches, a clutch assembly including a casing the face plate of which is provided with a central outwardly projecting sleeve, a clutch element therein, such element encircling the shaft end and having a collar projecting beyond the casing and within the sleeve, said collar having inclined shouldered notches in the outer edge of such projecting collar and normally in alinement with the notches at the end of the engine crank shaft, other clutch elements associated with the collar carrying clutch element for preventing rotary retrograde movement of the same, and a detachable hand crank including a head having inclined shouldered notches for mating with the aforementioned sets of notches entirely without the clutch casing but within the sleeve, whereby when the engine crank shaft is given a retrograde rotation, the momentum thereof will cause the hand crank head to be forced outwardly along the inclined notches of the collar and entirely freed from said engine crank shaft.

ABRAHAM WEISS.